US009254562B2

(12) United States Patent
Furusawa et al.

(10) Patent No.: US 9,254,562 B2
(45) Date of Patent: Feb. 9, 2016

(54) POWER TOOL

(75) Inventors: Masanori Furusawa, Anjo (JP); Yoshihiro Kasuya, Anjo (JP)

(73) Assignee: Makita Corporation, Anjo-Shi (JP)

( * ) Notice: Subject to any disclaimer, the term of this patent is extended or adjusted under 35 U.S.C. 154(b) by 701 days.

(21) Appl. No.: 13/360,136

(22) Filed: Jan. 27, 2012

(65) Prior Publication Data

US 2012/0205131 A1 Aug. 16, 2012

(30) Foreign Application Priority Data

Feb. 1, 2011 (JP) ................................ 2011-019974

(51) Int. Cl.

*B23B 45/16* (2006.01)
*B23B 47/04* (2006.01)
*B25D 16/00* (2006.01)
*B25F 5/02* (2006.01)

(52) U.S. Cl.

CPC ................ *B25F 5/02* (2013.01); *B25D 16/006* (2013.01); *B25D 2250/221* (2013.01); *B25D 2250/255* (2013.01)

(58) Field of Classification Search

CPC .............. B25F 5/00; B25F 5/001; B25F 5/02; B25B 21/00; B25D 16/006; B25D 2250/221; B25D 2250/255
USPC .............................. 173/20, 2, 4, 6, 11, 47, 48
See application file for complete search history.

(56) References Cited

U.S. PATENT DOCUMENTS

| | | | | |
|---|---|---|---|---|
| 6,176,321 | B1 * | 1/2001 | Arakawa et al. | 173/48 |
| 6,868,919 | B1 | 3/2005 | Manschitz et al. | |
| 7,322,427 | B2 | 1/2008 | Shimma et al. | |
| 2006/0108133 | A1 * | 5/2006 | Yamazaki | 173/104 |
| 2009/0065225 | A1 * | 3/2009 | Forster et al. | 173/2 |
| 2009/0120656 | A1 * | 5/2009 | Jung et al. | 173/48 |
| 2010/0236800 | A1 * | 9/2010 | Watanabe et al. | 173/20 |
| 2014/0216773 | A1 * | 8/2014 | Steurer | 173/1 |

FOREIGN PATENT DOCUMENTS

| | | | | |
|---|---|---|---|---|
| EP | 1 695 795 A1 | 8/2006 | | |
| EP | 2 233 252 A1 | 9/2010 | | |
| GB | 2404891 A * | 2/2005 | | B25F 5/00 |
| JP | S49-113170 U | 9/1974 | | |
| JP | A-2006-000957 | 1/2006 | | |
| JP | A-2010-221328 | 10/2010 | | |

OTHER PUBLICATIONS

Extended European Search Report issued in European Patent Application No. 12153334.3 dated May 29, 2012.

(Continued)

*Primary Examiner* — Thanh Truong
*Assistant Examiner* — Dianne Mitchell
(74) *Attorney, Agent, or Firm* — Oliff PLC

(57) ABSTRACT

An improved power tool is provided which can alert a user of any halfway selection of a driving mode of a tool bit. A representative power tool is provided which is capable of switching among driving modes different in driving state of a tool bit. The power tool has a mode switching member that switches among the driving modes, a detecting part that detects a drive prohibited state in which any of the driving modes of the tool bit is not selected, and indicating parts that indicate a result detected by the detecting part.

4 Claims, 5 Drawing Sheets

(56) References Cited

OTHER PUBLICATIONS

Jul. 29, 2014 Office Action issued in Japanese Patent Application No. 2011-019974 (with translation).

Mar. 19, 2015 Office Action issued in Japanese Application No. 2011-019974.

Jul. 17, 2015 Office Action issued in European Application No. 12153334.3.

* cited by examiner

POWER TOOL

BACKGROUND OF THE INVENTION

1. Field of the Invention

This invention relates to a power tool switchable among driving modes different in driving state of a tool bit.

2. Description of the Related Art

Japanese non-examined laid-open Patent Publication No. 2006-957 discloses a hammer drill which is capable of switching a driving mode of a tool bit in the form of a hammer bit between a hammer drill mode in which the hammer bit is caused to perform linear movement in its axial direction and rotation around its axis and a hammer mode in which the hammer bit is caused to perform linear movement in its axial direction. The known hammer drill has an operating mechanism that converts the rotating output of the motor into linear motion and then causes the hammer bit to linearly move via a striker, and a power transmitting mechanism that transmits the rotating output of the motor at reduced speed and causes the hammer bit to rotate. The power transmitting mechanism is provided with a mechanical claw clutch for switching the driving mode of the hammer bit. In order to switch the driving mode of the hammer bit between hammer drill mode and hammer mode, a mode switching member is operated to switch the claw clutch between a power transmission state and a power transmission interrupted state.

In the known claw clutch, when the driving mode of the hammer bit is switched from hammer mode to hammer drill mode by operating the mode switching member, driving-side clutch teeth and driven-side clutch teeth are engaged with each other, so that the clutch is shifted to the power transmission state.

Therefore, when the mode switching member is not switched to a normal hammer drill mode position and selection of the driving mode of the hammer bit is in a halfway state, the clutch teeth are also in halfway engagement. Driving of the hammer drill in such a halfway clutch engagement may cause acceleration of wear and decrease of durability.

SUMMARY OF THE INVENTION

Accordingly, it is an object of the invention to provide an improved power tool which can alert a user of any halfway selection of a driving mode of a tool bit.

In order to solve the above-described problem, according to a preferred embodiment of this invention, a power tool is provided which is capable of switching among driving modes different in driving state of a tool bit. The power tool includes a mode switching member that switches among the driving modes, a detecting part that detects a drive prohibited state in which any of the driving modes of the tool bit is not selected, and an indicating part that indicates a result detected by the detecting part. The "drive prohibited state" in this invention refers to a state in which the power tool must not be driven or driving the power tool is undesirable.

According to this invention, when selection of the driving mode of the tool bit is in the drive prohibited state in which any of the driving modes is not selected, or specifically when the mode switching member is not placed in any normal driving mode position, this state is detected by the detecting part and indicated by the indicating part. By this indication, the user is prompted to operate the mode switching member again to select the driving mode. As a result, the tool bit can be avoided from being driven in the drive prohibited state. Further, in this invention, with the construction in which the indicating part indicates that the mode switching member is placed outside of any normal driving mode position (in a halfway position), in contrast to a construction in which indication is made for each of the driving mode positions, it requires only a single indication.

According to a further embodiment of this invention, the power tool has a motor for driving the tool bit. When the detecting part detects the drive prohibited state, the indicating part controls driving of the motor and indicates by the controlled state of the motor that selection of the driving mode of the tool bit is in the drive prohibited state. The "drive control of the motor" in this invention typically represents the manner of stopping the motor or driving the motor at very slow speed so as to preclude operation of the tool bit.

According to this embodiment, when the user operates to drive the motor, the user can be made aware of any selection of the driving mode of the tool bit which is in the drive prohibited state, by visually checking the driving state of the tool bit.

According to a further embodiment of the power tool of this invention, the drive control of the motor is made by stopping the motor. The manner of "stopping the motor" here typically represents the manner of turning off the motor.

According to this embodiment, when selection of the driving mode of the tool bit is in the drive prohibited state, even if the user operates to drive the motor, the motor is not driven and thus the tool bit is not driven, so that the user can be alerted or made aware of this state.

According to a further embodiment of the power tool of this invention, the mode switching member is formed by a dial that is manually turned, and the detecting part for detecting the drive prohibited state is formed by a cam mechanism that is operated in conjunction with turning movement of the dial.

According to this embodiment, the cam mechanism can be compactly arranged in a concentrated manner in the vicinity of the dial.

According to a further embodiment of the power tool of this invention, the cam mechanism has a cam plate that rotates together with the dial, a swinging lever that swings according to a cam lift of the cam plate and a switch that is turned on and off by components of linear motion in the swinging movement of the swinging lever.

According to this embodiment, with the construction in which the switch is turned on and off by components of linear motion in the swinging movement of the swinging lever, the force of the swinging lever can be avoided from being applied to the switch in a direction other than the direction of movement, so that stable movement and failure prevention of the switch can be realized.

According to a further embodiment of the power tool of this invention, in addition to drive control of the motor, the indicating part includes an illuminating means that indicates at least one of a drive allowed state in which any one of the driving modes is selected and the drive prohibited state.

According to this embodiment, at least one of the drive allowed state and the drive prohibited state of the tool bit is indicated by the illuminating means in addition to drive control of the motor. Therefore, if the detecting part is formed only by drive control of the motor, the user may mistake the drive prohibited state for motor failure. According to this embodiment, however, the user's mistake can be avoided by using the illuminating means in combination with the motor drive control.

According to a further embodiment of the power tool of this invention, the power tool is provided and constructed as a hammer drill having at least one of hammer mode in which the tool bit is caused to perform only linear movement in its axial direction and drill mode in which the tool bit is caused to perform only rotation around its axis, and having hammer drill mode in which the tool bit is caused to perform both linear movement in its axial direction and rotation around its axis, as the driving modes of the tool bit.

According to this embodiment, in the hammer drill, when any of the hammer mode or the drill mode and the hammer drill mode is not selected, the detecting part detects this state and the indicating part indicates this state and thereby prompts the user to operate the mode switching member again to select the driving mode. As a result, the tool bit can be avoided from being driven in the drive prohibited state.

According to this invention, an improved power tool is provided which can alert a user of any halfway selection of a driving mode of a tool bit. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
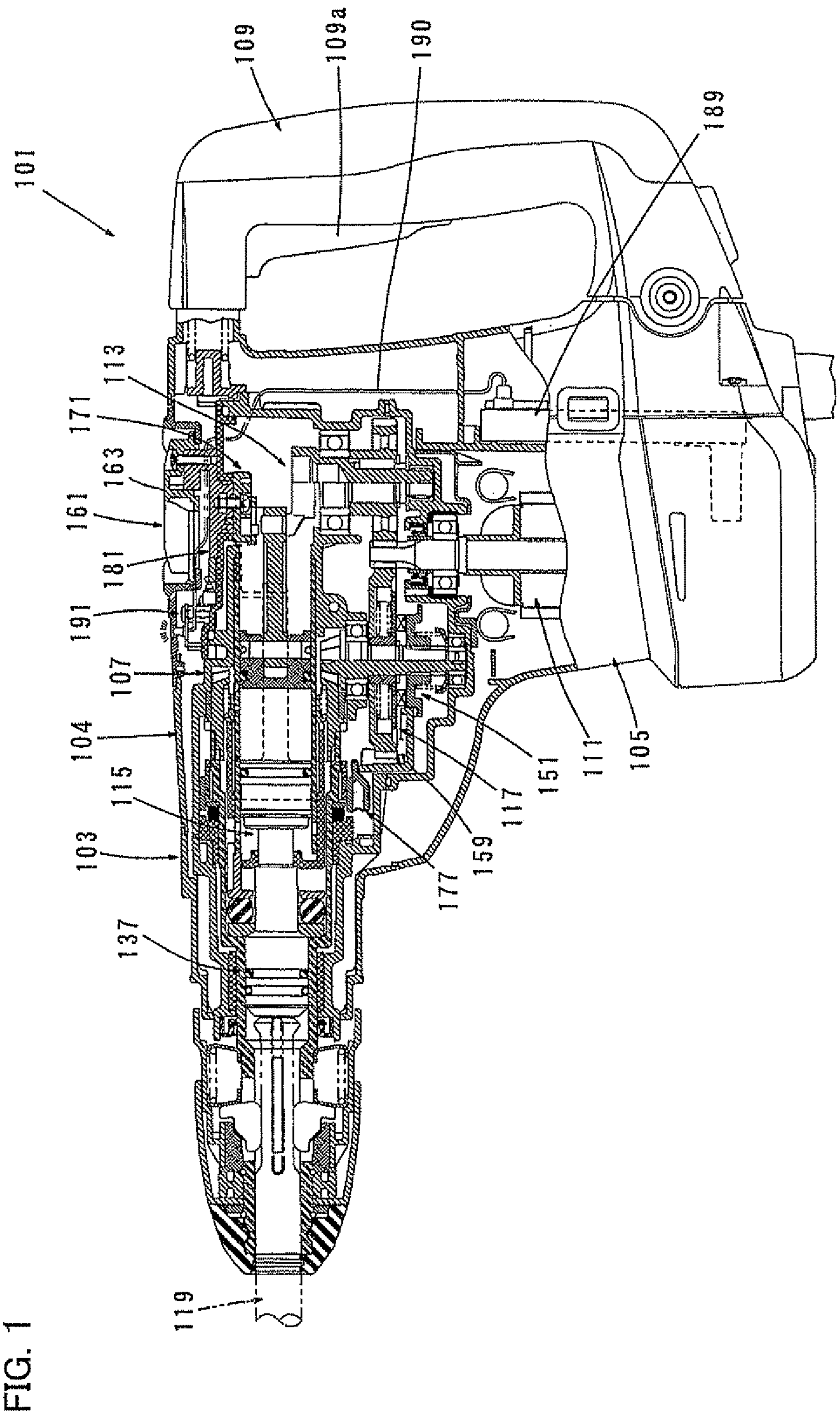
FIG. 1 is a side view, partly in section, showing an entire hammer drill according to an embodiment of the invention.

An electric hammer drill is now explained as a representative embodiment of the power tool according to this invention with reference to FIGS. 1 to 7. As shown in FIG. 1, the hammer drill 101 of this embodiment mainly includes a power tool body in the form of a body 103 that forms an outer shell of the hammer drill 101, a hammer bit 119 detachably coupled to a front end region (left end as viewed in FIG. 1) of the body 103 via a tool holder 137, and a handgrip 109 that is connected to the body 103 on the side opposite to the hammer bit 119 and designed to be held by a user. The hammer bit 119 is held by a tool holding member in the form of a hollow tool holder 137 such that it is allowed to linearly move in its axial direction with respect to the tool holder 137. The hammer bit 119 is a feature that corresponds to the "tool bit" according to this invention. Further, for the sake of convenience of explanation, the side of the hammer bit 119 is taken as the front and the side of the handgrip 109 as the rear.

The body 103 includes a motor housing 105 that houses a driving motor 111, an inner housing in the form of a gear housing 107 that houses a motion converting mechanism 113, a striking mechanism 115 and a power transmitting mechanism 117, and an outer housing 104 that covers the gear housing 107.

The driving motor is disposed such that its rotation axis runs vertically in a direction (vertical direction as viewed in FIG. 1) generally perpendicular to the longitudinal direction of the body 103 (the axial direction of the hammer bit 119). A rotating power of the driving motor 111 is converted into linear motion by the motion converting mechanism 113 and then transmitted to the striking mechanism 115. As a result, an impact force is generated in the axial direction (horizontal direction as viewed in FIG. 1) of the hammer bit 119 via the striking mechanism 115. The motion converting mechanism 113 and the striking mechanism 115 form a striking drive mechanism.

Further, the rotation speed of the driving motor 111 is reduced by the power transmitting mechanism 117 and then the rotating output of the driving motor 111 is transmitted to the hammer bit 119 via the tool holder 137. As a result, the hammer bit 119 is caused to rotate in a circumferential direction. The driving motor 111 is driven when a trigger **109*a* on the handgrip 109 is depressed. The power transmitting mechanism 117** forms a rotational drive mechanism.

Figure 2:
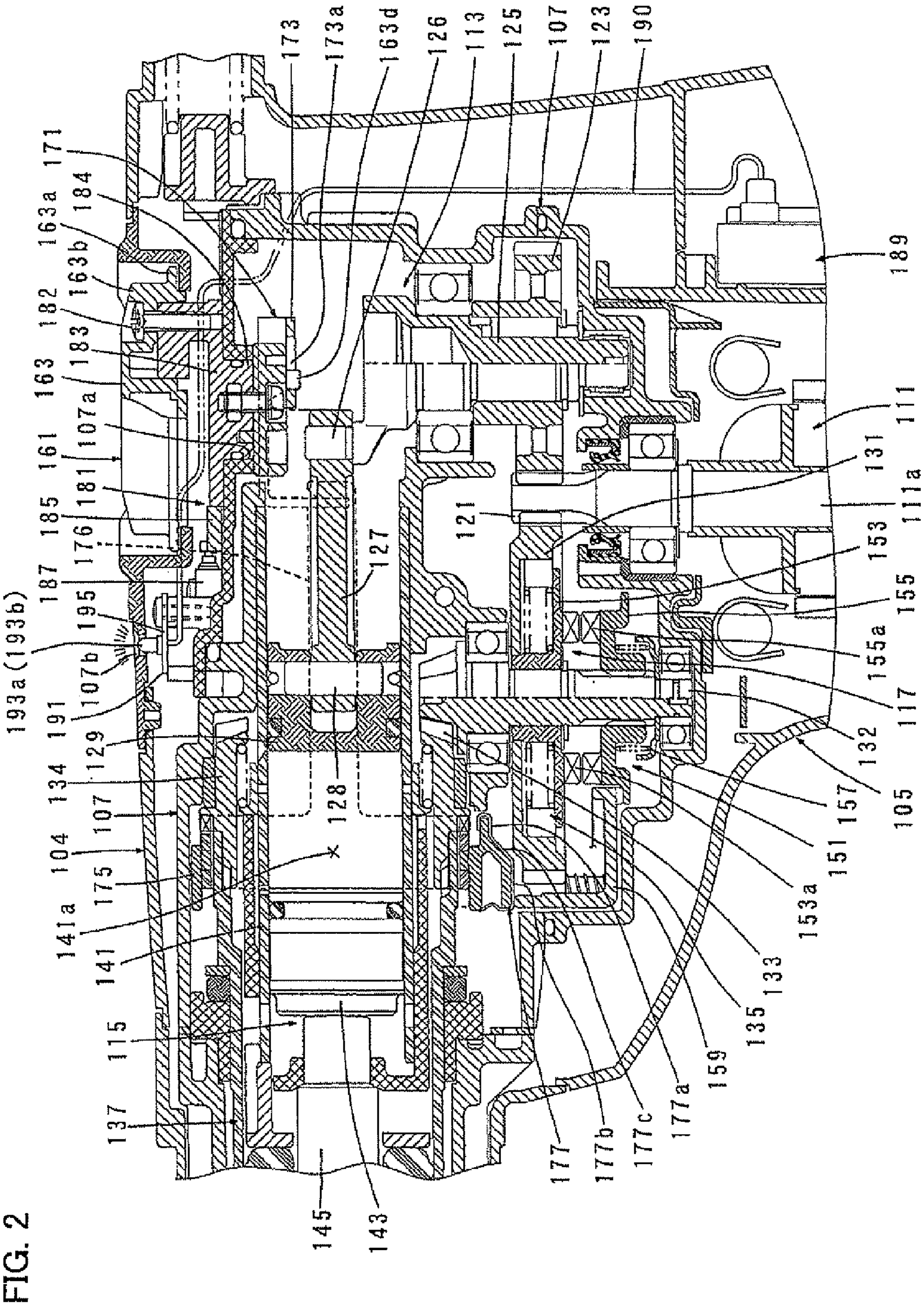
FIG. 2 is a partly enlarged sectional view of FIG. 1.

FIG. 2 shows an essential part of the hammer drill 101. As shown in FIG. 2, the motion converting mechanism 113 mainly includes a driving gear 121 that is formed on a motor shaft **111*a* of the driving motor 111 and rotationally driven in a horizontal plane, a driven gear 123 that engages with the driving gear 121, a crank shaft 125 that rotates together with the driven gear 123, a crank pin 126 that is eccentrically disposed on the crank shaft 125, a crank arm 127 that is loosely connected to the crank pin 126, and a driving element in the form of a piston 129 that is mounted to the crank arm 127 via a connecting shaft 128. The motor shaft 111*a* and the crank shaft 125 are disposed parallel to each other and side by side in the longitudinal direction of the body. The crank shaft 125, the crank pin 126, the crank arm 127 and the piston 129 form a crank mechanism. The piston 129 is slidably disposed within the cylinder 141 and linearly moves in the axial direction of the hammer bit along the cylinder 141 when the driving motor 111** is driven.

The striking mechanism 115 mainly includes a striking element in the form of a striker 143 that is slidably disposed within the bore of the cylinder 141, and an intermediate element in the form of an impact bolt 145 that is slidably disposed within the tool holder 137 and transmits the kinetic energy of the striker 143 to the hammer bit 119. The cylinder 141 has an air chamber **141*a* defined by the piston 129 and the striker 143. The striker 143 is driven via pressure fluctuations (air spring) of the air chamber 141*a* which is caused by sliding movement of the piston 129. The striker 143 then collides with (strikes) the impact bolt 145 that is slidably disposed within the tool holder 137, and transmits the striking force to the hammer bit 119 via the impact bolt 145**.

The tool holder 137 is disposed coaxially with the cylinder 141 such that it can rotate, and rotated via the power transmitting mechanism 117 by the driving motor 111. A clutch mechanism 151 is disposed in a region of the power transmitting mechanism 117 and serves to allow transmission of rotation of the driving motor 111 to the tool holder 137 or to interrupt such transmission.

In the power transmitting mechanism 117, rotation of the intermediate gear 131 which engages with the driving gear 121 driven by the driving motor 111 is transmitted to the intermediate shaft 132 via the clutch mechanism 151. The rotation of the intermediate shaft 132 is then transmitted from a small bevel gear 133 to the tool holder 137 via a large bevel gear 134 which engages with the small bevel gear 133. The small bevel gear 133 is integrally formed on an axial end (upper end as viewed in FIG. 2) of the intermediate shaft 132. The large bevel gear 134 which engages with the small bevel gear 133 is disposed coaxially with the cylinder 141 and rotates together with the tool holder 137. The intermediate shaft 132 is disposed in parallel to the motor shaft 111*a* of the driving motor 111 and perpendicularly to the axial direction of the hammer bit.

The clutch mechanism 151 is provided as a mode switching claw clutch for switching a driving mode of the hammer bit 119. Further, the clutch mechanism 151 mainly includes a driving-side clutch member 153 which is loosely fitted onto the intermediate shaft 132 and a driven-side clutch member 155 which is spline-fitted onto the intermediate shaft 132 such that it can slide in the axial direction and rotate together with the intermediate shaft 132 in a circumferential direction. The driving-side clutch member 153 is connected to the intermediate gear 131 via a torque limiter 135, and when the driving motor 111 is driven and the rotational load on the hammer bit 119 is within the range of critical value set at the torque limiter 135, the driving-side clutch member 153 is caused to rotate together with the intermediate gear 131.

The driving-side clutch member 153 and the driven-side clutch member 155 are opposed to each other in a direction (vertical direction) transverse to the axial direction of the hammer bit and have clutch teeth 153*a*, 155*a*, respectively, on their opposed surfaces. The driven-side clutch member 155 is constantly biased toward the driving-side clutch member 153 by a biasing force of a biasing member in the form of a clutch spring 157. When the clutch teeth 155*a* of the driven-side clutch member 155 is engaged with the clutch teeth 153*a* of the driving-side clutch member 153, rotation of the driven-side clutch member 155 is transmitted to the intermediate shaft 132 (see FIG. 1). Further, when the driven-side clutch member 155 is separated from the driving-side clutch member 153 against the clutch spring 157, the clutch teeth 153*a*, 155*a* are disengaged from each other, so that the transmission of rotation to the intermediate shaft 132 is interrupted (see FIG. 2).

The electric hammer drill 101 has a mode switching mechanism 161 for switching the driving mode of the hammer bit 119. In this embodiment, the mode switching mechanism 161 can be switched between a hammer mode for causing the hammer bit 119 to perform only striking movement in the axial direction and a hammer drill mode for causing the hammer bit 119 to perform striking movement in the axial direction and rotation in the circumferential direction. The hammer mode and the hammer drill mode are features that correspond to the "driving modes different in driving state" according to this invention.

Figure 3:
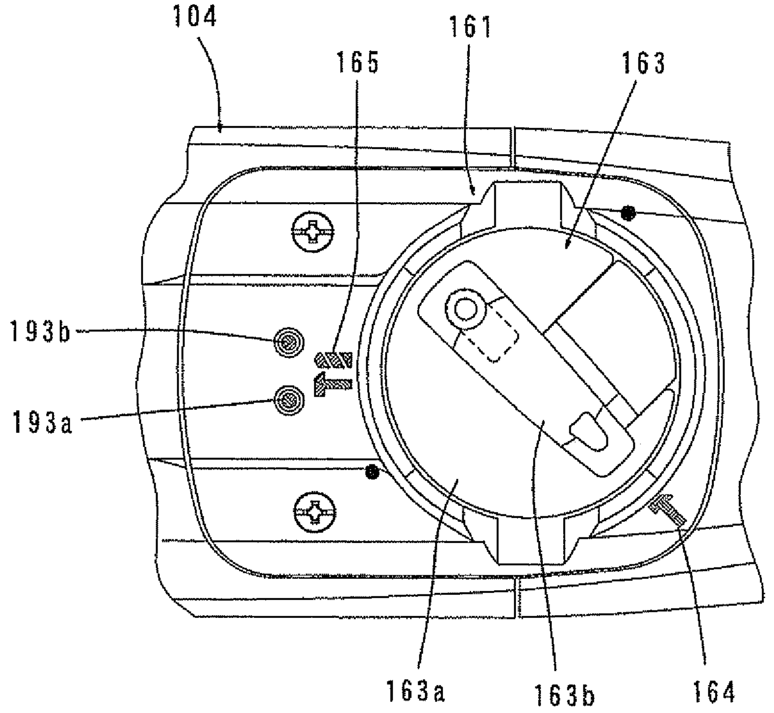
FIG. 3 is a planar view showing a driving mode switching part for switching a driving mode of a hammer bit, in a state in which a mode switching dial is placed in a hammer mode position.
Figure 4:
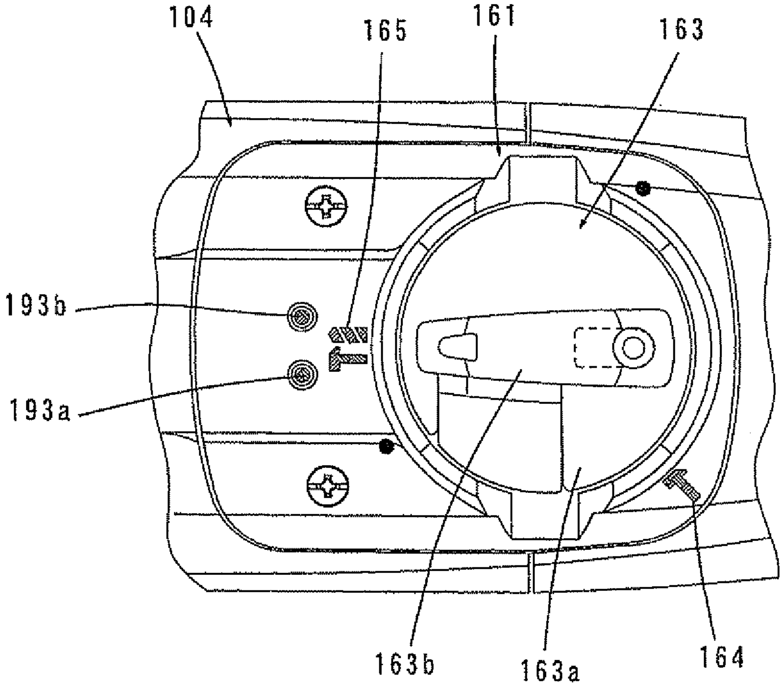
FIG. 4 is a planar view showing the driving mode switching part, in a state in which the mode switching dial is placed in a hammer drill mode position.

The mode switching mechanism 161 is now explained with reference to FIGS. 2 to 4. The mode switching mechanism 161 mainly includes a mode switching dial 163 which can be switched between hammer mode and hammer drill mode, and is connected to the clutch mechanism 151 via a clutch switching mechanism 171. When the mode switching dial 163 is placed in a hammer mode position (the hammer mode is selected), the clutch mechanism 151 is brought into a power transmission interrupted state. Further, when the mode switching dial 163 is placed in a hammer drill mode position (the hammer drill mode is selected), the clutch mechanism 151 is turned into a power transmission state. The mode switching dial 163 is disposed externally (on the upper side as viewed in FIG. 2) on the upper surface of the outer housing 104 and can be operated from outside by the user. The mode switching dial 163 is a feature that corresponds to the "mode switching member" and the "dial" according to this invention.

The mode switching dial 163 includes a disc 163*a* with an operating grip 163*b* and disposed on the outer housing 104 such that it can be turned in a horizontal plane. The operating grip 163*b* is mounted on the top of the disc 163*a* such that it extends diametrically. Further, one end of the operating grip 163*b* in its extending direction is tapered and serves as a switching position indicating part. Further, a mark 164 indicating the hammer mode position and a mark 165 indicating the hammer drill mode position are put on the outer housing 104 with predetermined spacing in the circumferential direction.

A cam plate 183 has a circular boss part 184 on its underside and is fixedly fastened to the underside of the disc 163*a* by a screw 182. The boss part 184 is rotatably supported in an opening 107*a* formed in the gear housing 107. Specifically, the underside of the mode switching dial 163 disposed on the upper surface of the outer housing 104 faces the internal space of the gear housing 107 through the outer housing 104 and the gear housing 107 and is rotatably supported by the opening 107*a* of the gear housing 107. Further, an operating pin 163*d* is mounted on the underside of the cam plate 183 in a position displaced from a center of rotation of the mode switching dial 163 and rotates together with the mode switching dial 163. The operating pin 163*d* operates in conjunction with the clutch switching mechanism 171 disposed within the gear housing 107. Further, the cam plate 183 is provided as one of components forming a detecting mechanism 181 for detecting that the mode switching dial 163 is placed in a position other than normal driving mode positions, which will be described below.

The clutch switching mechanism 171 is provided as a switching movement transmitting member for transmitting turning movement of the mode switching dial 163 to the clutch mechanism 151 when the mode switching dial 163 is turned in the circumferential direction to switch the driving mode, and disposed within the gear housing 107. As shown in FIG. 2, the clutch switching mechanism 171 mainly includes a frame member 173 that is rectilinearly moved in the axial direction of the hammer bit by eccentric rotation of the operating pin 163*d* when the mode switching dial 163 is turned in a horizontal plane, a ring member 175 that is fitted on an outer periphery of the tool holder 137 and can move in the axial direction of the hammer bit, a connecting member 176 that transmits rectilinear movement of the frame member 173 to the ring member 175, and a cam member 177 that is provided on the ring member 175 and controls engagement of the clutch mechanism 151. Further, the frame member 173 is engaged with the operating pin 163*d* via a slot 173*a* extending in a horizontal direction transverse to the axial direction of the hammer bit, and the frame member 173 is caused to rectilinearly move in the longitudinal direction of the cylinder 141 by components of linear motion of the eccentrically rotating pin 163*d* in the longitudinal direction of the cylinder.

The cam member 177 is provided on the underside of the ring member 175, and an underside of the cam member 177 is stepped in the vertical direction transverse to the axial direction of the hammer bit and has an upper cam face 177*a*, a lower cam face 177*b* and an inclined surface 177*c* which connects the cam faces 177*a*, 177*b*. The cam member 177 serves to switch the operating state of the clutch mechanism 151 via a cam follower in the form of a clutch-switching actuation member 159 by horizontally moving in the longitudinal direction of the cylinder together with the ring member 175.

As shown in FIG. 2, the clutch-switching actuation member 159 is provided as a member having an L-shaped section which can move rectilinearly in the vertical direction transverse to the axial direction of the hammer bit. The clutch-switching actuation member 159 has an upper end held in contact with the underside (cam face) of the cam member 177 and a lower end held in contact with an upper surface of the driven-side clutch member 155 in the clutch mechanism 151.

In the hammer drill 101 constructed as described above, when the user turns the mode switching dial 163 to the hammer mode position (see FIG. 3), the frame member 173 of the clutch switching mechanism 171 is moved rearward (toward the right end as viewed in FIG. 2 or "toward the handgrip 109") and then the ring member 175 and the cam member 177 are also moved in the same direction. By this movement, the clutch-switching actuation member 159 is pushed downward by the inclined surface 177*c* of the cam member 177 and moved downward in the direction of the axis of the intermediate shaft 132. The clutch-switching actuation member 159 then comes in contact with the lower cam face 177*b* and is held in this position. By the downward movement of the clutch-switching actuation member 159, the driven-side clutch member 155 is separated from the driving-side clutch member 153 against the clutch spring 157, so that the clutch teeth 155*a* of the driven-side clutch member 155 are disengaged from the clutch teeth 153*a* of the driving-side clutch member 153. This state is shown in FIG. 2.

In this state, when the user depresses the trigger 109*a* on the handgrip 109 and the driving motor 111 is driven, rotation of the driving motor 111 is converted into linear motion by the motion converting mechanism 113 and then transmitted to the hammer bit 119 as linear motion via the striker 143 and the impact bolt 145 which form the striking mechanism 115. At this time, as described above, the clutch mechanism 151 of the power transmitting mechanism 117 is in disengagement, and thus, the hammer bit 119 does not rotate. Therefore, when the hammer mode is selected, a predetermined hammering operation is performed solely by striking movement (hammering movement) of the hammer bit 119.

When the user turns the mode switching dial 163 to the hammer drill mode position (see FIG. 4), the frame member 173 of the clutch switching mechanism 171 is moved forward (toward the left end as viewed in FIG. 2 or "toward the hammer bit 119"). Thus, the ring member 175 and the cam member 177 are also moved in the same direction, and the upper end of the clutch-switching actuation member 159 slides on the inclined surface 177*c* of the cam member 177 and comes in contact with the upper cam face 177*a*. Therefore, the driven-side clutch member 155 is moved toward the driving-side clutch member 153 by the biasing force of the clutch spring 157, so that the clutch teeth 155*a* of the driven-side clutch member 155 are engaged with the clutch teeth 153*a* of the driving-side clutch member 153. This state is shown in FIG. 1.

In this state, when the driving motor 111 is driven, in addition to the striking movement of the hammer bit 119 in the axial direction which is caused by the motion converting mechanism 113 and the striking mechanism 115, the rotating output of the driving motor 111 is transmitted as rotation to the tool holder 137 and the hammer bit 119 held by the tool holder 137 via the power transmitting mechanism 117. Specifically, when the hammer drill mode is selected, the hammer bit 119 is driven by striking movement (hammering movement) and rotation (drilling movement), so that a predetermined hammer drill operation can be performed on a workpiece.

As described above, however, in the construction in which the mode switching dial 163 is operated to switch the claw clutch mechanism 151 between the power transmission state and the power transmission interrupted state by controlling engagement between the clutch teeth 153*a* and 155*a* of the claw clutch mechanism 151 in order to switch the driving mode of the hammer bit 119 between the hammer mode and the hammer drill mode, it may possibly happen that neither the normal hammer mode nor the hammer drill mode is selected as the driving mode of the hammer bit 119. Specifically, in mode switching operation, the mode switching dial 163 may be placed halfway to a proper mode position. In such a case, a switching stroke of the driven-side clutch member 155 is inadequate, so that the clutch teeth 155*a*, 153*a* of the clutch mechanism 151 are inadequately engaged with each other. When the hammer drill 101 is driven in such an inadequately engaged state, in the case of switching from hammer drill mode to hammer mode, the hammer bit 119 continues to rotate, so that the user notices that the mode switching dial 163 is not turned to the normal hammer mode position. In the case of switching from hammer mode to hammer drill mode, however, the user performs the hammer drill operation without noticing such a state. As a result, wear of the clutch teeth 153*a*, 155*a* is accelerated and durability of the clutch mechanism 151 is impaired.

In this embodiment, therefore, it is constructed to alert the user that the mode selection is in a drive prohibited state in which driving of the hammer bit 119 is to be prohibited when neither the hammer mode nor the hammer drill mode is selected as the driving mode of the hammer bit 119 with the mode switching dial 163. For this purpose, in this embodiment, a detecting mechanism 181 for detecting the drive prohibited state and an indicating mechanism for indicating the drive prohibited state according to this detection are provided. The detecting mechanism 181 and the indicating mechanism are now explained with reference to FIGS. 2 and 5 to 7.

The detecting mechanism 181 for detecting the drive prohibited state mainly includes a cam mechanism that operates in conjunction with the mode switching movement of the mode switching dial 163, and is a feature that corresponds to the "detecting part" according to this invention. The cam mechanism mainly includes the disc-like cam plate 183 that rotates together with the mode switching dial 163, a swinging lever 185 that swings according to the cam lift of the cam plate 183 (a difference between a radius from the center of the cam plate 183 to a circumferential surface 183*a* and a radius from the center of the cam plate 183 to bottoms of recesses 183*b*, 183*c* which are described below) and a microswitch 187 that is turned on and off by components of linear motion in the swinging movement of the swinging lever 185.

The cam plate 183 is fixedly fastened to the underside of the disc 163*a* of the mode switching dial 163 by a screw 182 and has the circular boss part 184 on its underside. The boss part 184 is held in the opening 107*a* of the gear housing 107 such that it can rotate in the horizontal plane. The cam plate 183 has a circumferential surface 183*a* provided as a region for detecting the drive prohibited state, and two generally V-shaped recesses 183*b*, 183*c* that are formed in the circumferential surface 183*a* and provided as a region for detecting the driving mode. One of the recesses 183*b* is for use in detecting hammer mode and the other recess 183*c* is for use in detecting hammer drill mode. Both of the recesses 183*b*, 183*c* are formed in the circumferential surface 183*a* in the circumferential direction with a spacing corresponding to the distance between the hammer mode position mark 164 and the hammer drill mode position mark 165 which are put on the outer housing 104. As should be appreciated, the recesses 183*b*. 183*c* are an example of regions for detecting the operating modes and the circumferential surface of the cam plate 183 between the recesses 183*b*, 183*c* is an example of regions for detecting the drive prohibited state.

The swinging lever 185 is disposed in front of the cam plate 183 and extends horizontally in a lateral direction transverse to the axial direction of the hammer bit. The swinging lever 185 is a feature that corresponds to the "swinging lever" according to this invention. One end of the swinging lever 185 in the extending direction is mounted to the gear housing 107 such that it can swing on a mounting shaft 185*a* in the front-back direction (the axial direction of the hammer bit). The other end of the swinging lever 185 in the extending direction is designed as a pressing part 185*b* which faces an actuating element 187*a* of the microswitch 187. Further, the swinging lever 185 is constantly biased by a spring (not shown) in such a manner as to swing toward the circumferential surface of the cam plate 183.

Figure 5:
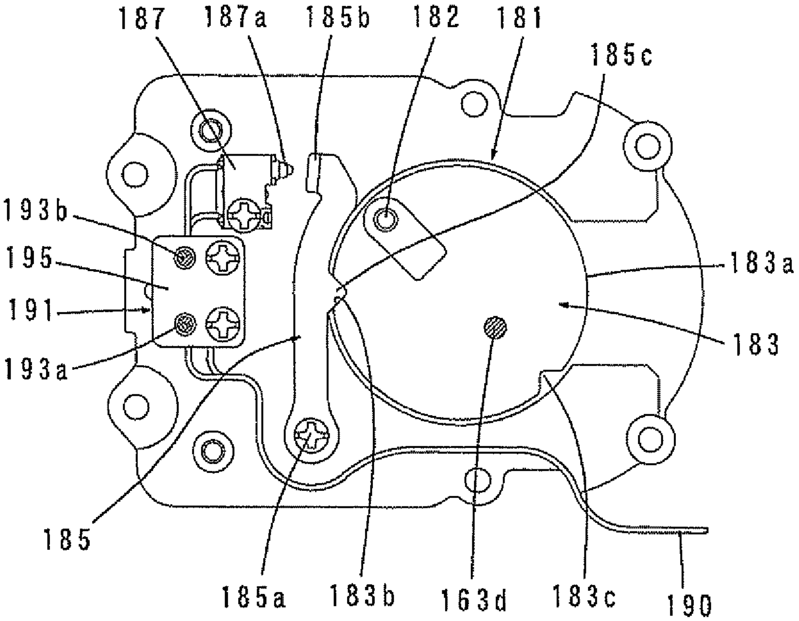
FIG. 5 is a planar view showing a detecting mechanism for detecting the driving mode, in a state in which the hammer mode is detected.
Figure 6:
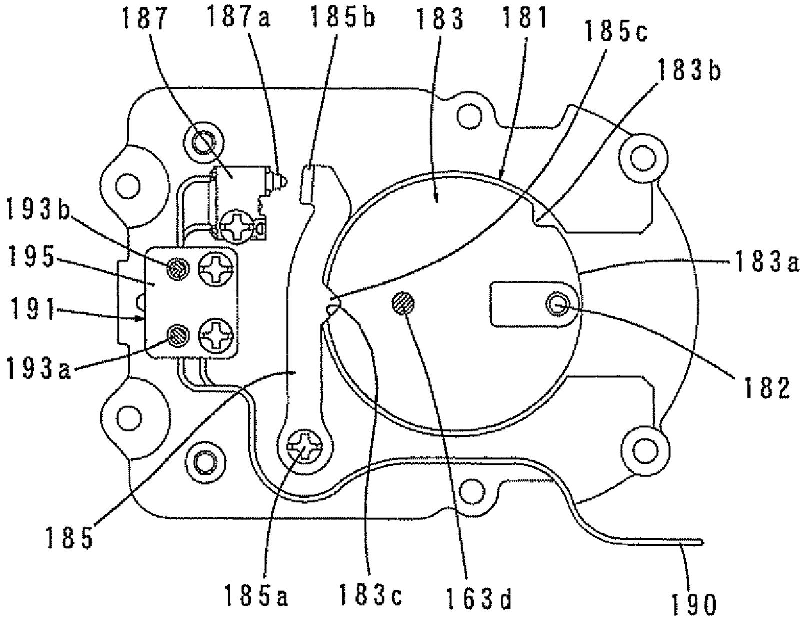
FIG. 6 is a planar view showing the detecting mechanism for detecting the driving mode, in a state in which the hammer drill mode is detected.

A protrusion 185*c* is formed on the swinging lever 185 at a midpoint position in the extending direction at which the swinging lever 185 can come in contact with the circumferential surface 183*a* of the cam plate 183. The protrusion 185*c* has a generally V-shaped form corresponding to the shape of the recess 183*b* for hammer mode and the recess 183*c* for hammer drill mode. When the mode switching dial 163 is placed in (selects) the normal hammer mode position or hammer drill mode position, the swinging lever 185 is caused to swing rearward by the biasing force of the spring and the protrusion 185*c* is engaged with the recess 183*b* for hammer mode or the recess 183*c* for hammer drill mode. In this engaged state, the pressing part 185*b* is separated from the actuating element 187*a* of the microswitch 187 and the microswitch 187 is turned off. This state is shown in FIGS. 5 and 6.

Figure 7:
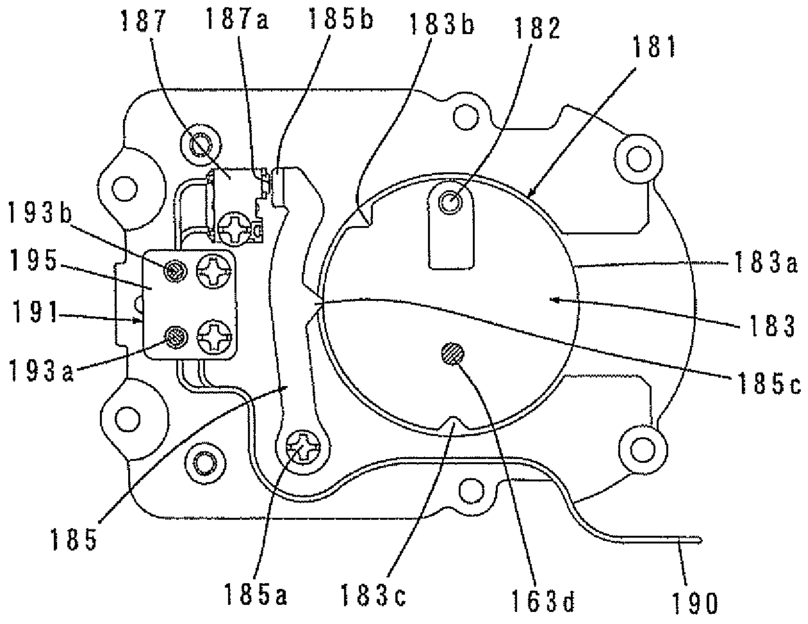
FIG. 7 is a planar view showing the detecting mechanism for detecting the driving mode, in a drive prohibited state in which neither the hammer mode nor the hammer drill mode is selected.

When the mode switching dial 163 is turned to a position other than the normal hammer mode position or hammer drill mode position, the protrusion 185*c* is pushed out of the recess 183*b* or 183*c* by an inclined surface of the recess 183*b* for hammer mode or the recess 183*c* for hammer drill mode and abuts against the circumferential surface 183*a*. Thus, the swinging lever 185 swings forward against the biasing force of the spring, and the pressing part 185*b* presses the actuating element 187*a* of the microswitch 187 so that the microswitch 187 is turned on. This state is shown in FIG. 7. Specifically, when neither the hammer mode nor the hammer drill mode is selected as the driving mode of the hammer bit 119, the microswitch 187 is turned on.

The pressing part 185*b* of the swinging lever 185 has a flat surface and the actuating element 187*a* of the microswitch 187 has a spherical surface. With such a construction, the pressing part 185*b* of the swinging lever 185 pushes the actuating element 187*a* of the microswitch 187 in sliding contact therewith. Therefore, on-off control of the microswitch 187 is made only by components of linear motion of the swinging lever 185 in the swinging direction (front-back direction).

The on/off state of the microswitch 187 is inputted as an on/off signal into a motor control device in the form of a controller 189 for controlling the driving motor 111 via a lead 190. When the off signal is inputted into the controller 189 from the microswitch 187, the controller 189 turns on the driving motor 111. Further, when the on signal is inputted into the controller 189 from the microswitch 187, the controller 189 turns off the driving motor 111. When the power is on, the driving motor 111 can be driven by depressing the trigger 109*a*. When the power is off, however, even if the trigger 109*a* is depressed, the driving motor 111 is kept in the stopped state in which the driving motor 111 cannot be driven. Specifically, when the mode switching dial 163 is placed in a position other than the normal hammer mode position or hammer drill mode position, the controller 189 turns off the power and does not enable the driving motor 111 to be driven by depressing the trigger 109*a*, and thereby alerts the user that the mode selection is in a drive prohibited state. In other words, unless the mode switching dial 163 is reliably placed in the hammer mode position or the hammer drill mode position, the driving motor 111 is not turned on. A drive control of the driving motor 111 by the controller 189 forms a first indicating mechanism for indicating a drive prohibited state. Further, the on signal of the microswitch 187 is designed and provided as a signal for detecting that the mode switching dial 163 is placed in a position other than the normal hammer mode position or hammer drill mode position.

Further, in this embodiment, in addition to the "first indicating mechanism" formed by the drive control of the driving motor 111, a second indicating mechanism which mainly includes a lamp unit 191 is provided. The lamp unit 191 mainly includes a plurality of lamps (LED) 193*a*, 193*b* and a lamp holding part 195 for holding the lamps 193*a*, 193*b*, and is fixedly mounted on the outside of the gear housing 107. The lamps 193*a*, 193*b* emit light to the outside through illumination holes 107*b* (see FIG. 2) formed in the outer housing 104. The lamps (LED) 193*a*, 193*b* are features that correspond to the "illuminating means" according to this invention.

One of the lamps 193*a* is defined as a lamp for indicating a drive prohibited state and the other lamp 193*b* as a lamp for indicating a drive allowed state. When the above-described microswitch 187 is in the on state, the lamp 193*a* is turned on and the lamp 193*b* is turned off. When the microswitch 187 is in the off state, the lamp 193*a* is turned off and the lamp 193*b* is turned on. The lamps 193*a*, 193*b* are designed to emit light of different colors. For example, it is designed such that the lamp 193*a* emits red light and the lamp 193*b* emits blue light. The first indicating mechanism and the second indicating mechanism are features that correspond to the "indicating part" according to this invention.

According to this embodiment constructed as described above, when the mode switching dial 163 is placed in a halfway position between the hammer mode position and the hammer drill mode position, the swinging lever 185 is swung forward by the cam plate 183 of the detecting mechanism 181 formed by the cam mechanism, so that the microswitch 187 is turned on. Thus, the mode selection is detected as being in the drive prohibited state. In response to this detected signal, the controller 189 turns off the driving motor 111 and does not enable the driving motor 111 to be driven. Therefore, even if the user depresses the trigger 109*a*, the driving motor 111 is not driven and thus the hammer bit 119 is not driven. From this state, the user can be alerted or made aware of any selection of the driving mode of the hammer bit 119 which is in the drive prohibited state.

In a construction in which the drive prohibited state is indicated by stopping the driving motor 111 via the controller 189, the user may mistake the drive prohibited state for motor failure. According to this embodiment, however, with the construction in which the lamp 193*a* illuminates to indicate the drive prohibited state when the microswitch 187 is turned on, the mistake as described above can be eliminated. In this manner, according to this embodiment, halfway mode selection with the mode switching dial 163 is indicated so that the user is prompted to turn the mode switching dial 163 to the normal driving mode position. Thus, wear can be prevented from being accelerated by halfway engagement between the clutch teeth 153*a*, 155*a* of the clutch mechanism 151 due to a halfway mode selection.

When the mode switching dial 163 is placed in the normal hammer mode position or hammer drill mode position, the other lamp 193*b* illuminates and indicates that the driving mode of the hammer bit 119 is properly selected. At the same time, the driving motor 111 is turned on by the controller 189 and can be driven by operating the trigger 109*a*.

According to this embodiment, with the construction in which the detecting mechanism 181 for detecting the drive prohibited state is formed by the cam mechanism operated in conjunction with turning movement of the mode switching dial 163, the cam mechanism can be compactly arranged in a concentrated manner in the vicinity of the mode switching dial 163. Further, with the construction in which the cam mechanism is disposed by utilizing a space between the gear housing 107 and the outer housing covering the gear housing 107, rational placement is realized without increase of the size of the body 103.

In this embodiment, the swinging lever 185 is disposed between the cam plate 183 and the microswitch 187, and the microswitch 187 is turned on and off by components of linear motion of the swinging lever 185 in the swinging direction. Therefore, the swinging lever 185 can be avoided from applying a force to the microswitch 187 in a direction transverse to the direction of its movement, so that this construction is effective in stable movement and failure prevention of the microswitch 187.

According to this embodiment, the hammer drill 101 has a plurality of indicating mechanisms or the "first indicating mechanism" including the drive control of the driving motor 111 by the controller 189 and the second indicating mechanism including the lamp unit 191. Therefore, the drive prohibited state can be more reliably detected.

In the above-described embodiment, in the drive control of the driving motor 111 by the controller 189, the driving motor 111 is described as being turned off and stopped, but it may be constructed such that the driving motor 111 is held in the on state and driven at a speed too slow to perform an operation by the hammer bit 119.

In this embodiment, the hammer drill is explained which is capable of switching the driving mode of the hammer bit 119 between hammer mode and hammer drill mode, but this invention can also be applied to a hammer drill which provides a drill mode in which the hammer bit 119 is caused only to rotate in the circumferential direction, or a neutral mode in which the user holds the hammer bit 119 and can arbitrarily rotate it, in addition to the above-described two driving modes. In this case, in this embodiment, with the construction in which the circumferential surface 183*a* of the disc-like cam plate 183 is provided as the region for detecting the drive prohibited state, such an additional driving mode can be easily provided by forming a recess for use in the additional mode in the circumferential surface 183*a*. Therefore, no additional element or component is needed, so that cost increase can be prevented. As should be appreciate the hammer mode, the hammer drill mode, the drill mode and the neutral mode are each an example of an operating mode because they are each a predetermined mode in which the hammer drill can operate.

In this embodiment, the drive prohibited state is indicated by drive control of the motor via the controller 189. In place of drive control of the motor, however, it may be constructed such that the drive prohibited state is indicated by locking (fixing) the operating member (the trigger 109*a*) for driving the driving motor 111 such that it cannot be operated.

In this embodiment, the two different kinds of lamps, i.e. the lamp 193*a* for indicating the drive prohibited state of the driving mode of the hammer bit 119 and the lamp 193*b* for indicating the drive allowed state, are provided and the lamps indicate the respective states. As an alternative to this construction, however, only one kind of the lamp may be provided to indicate either the drive prohibited state or the drive allowed state. Specifically, it may be constructed such that the lamp illuminates in the drive prohibited state, or such that the lamp illuminates in the drive allowed state.

In the above-described embodiment, the hammer drill 101 is explained as a representative example of the power tool according to this invention, but this invention can also be applied to any other power tool which is capable of switching among driving modes different in the driving state of the tool bit.

In view of the above-described, following features is also provided according to the invention.

(1)

"A power tool, which is capable of switching among driving modes different in driving state of a tool bit, comprising:

- a mode switching member that switches among the driving modes,
- a detecting part that detects a drive prohibited state in which any of the driving modes of the tool bit is not selected, and
- an indicating part that indicates a result detected by the detecting part, wherein:
- when the detecting part detects the drive prohibited state, the indicating part indicates said state and thereby prompts the user to operate the mode switching member again to select the driving mode."

DESCRIPTION OF NUMERALS

101 hammer drill (power tool)
103 body
104 outer housing
105 motor housing
107 gear housing
107*a* opening
107*b* illumination hole
109 handgrip
109*a* trigger
111 driving motor
111*a* motor shaft
113 motion converting mechanism
115 striking mechanism
117 power transmitting mechanism
119 hammer bit (tool bit)
121 driving gear
123 driven gear

125 crank shaft
126 crank pin
127 crank arm
128 connecting shaft
129 piston
131 intermediate gear
132 intermediate shaft
133 small bevel gear
134 large bevel gear
135 torque limiter
137 tool holder
141 cylinder
141*a* air chamber
143 striker
145 impact bolt
151 clutch mechanism
153 driving-side clutch member
153*a* clutch teeth
155 driven-side clutch member
155*a* clutch teeth
157 clutch spring
159 clutch-switching actuation member
161 mode switching mechanism
163 mode switching dial
163*a* disc
163*b* operating grip
163*d* operating pin
164 mark of hammer mode position
165 mark of hammer drill mode position
171 clutch switching mechanism
173 frame member
173*a* slot
175 ring member
176 connecting member
177 cam member
177*a* upper cam face
177*b* lower cam face
177*c* inclined surface
181 detecting mechanism (detecting part, cam mechanism)
182 screw
183 cam plate
183*a* circumferential surface
183*b* recess for hammer mode
183*e* recess for hammer drill mode
184 boss part
185 swinging lever
185*a* mounting shaft
185*b* pressing part
185*c* protrusion
187 microswitch
187*a* actuating element
189 controller (indicating part, first indicating mechanism)
190 lead
191 lamp unit (indicating part, second indicating mechanism)
193*a*, 193*b* lamp
195 lamp holding part

What we claim is:

1. A power tool switchable among driving modes different in driving state of a tool bit, comprising:

a mode switching member that switches between the driving modes, wherein the mode switching member comprises a dial that is manually turned, a detecting part that detects whether the mode switching member has been placed in any one of the driving modes or has been placed at a position between the driving modes, a motor that drives the tool bit, wherein the detecting part comprising:

a cam plate that is operated in conjunction with a turning movement of the dial and that is formed with a disk-like shape, the cam plate comprises regions for detecting the driving modes and regions for detecting a drive prohibited state, the regions for detecting the driving modes comprises recesses and each of the recesses corresponds to a designated driving mode of the driving modes, and the regions for detecting the drive prohibited state comprises a smooth outer circumferential surface of the cam plate between the recesses, a swinging lever with a protrusion, and a switch that is either turned off to allow driving of the motor or turned on to prevent driving of the motor in the drive prohibited state, when the cam plate is turned by the dial such that the protrusion of the swinging lever is in one of the recesses, the swinging lever is not in contact with the switch in order to turn off the switch to allow driving of the motor, and when the cam plate is turned by the dial such that the protrusion of the swinging lever is not in one of the recesses but is instead in contact with the smooth outer circumferential surface, the swinging lever is in contact with the switch in order to turn on the switch to detect the drive prohibited state to prevent driving of the motor, and an indicating part that indicates a result detected by the detecting part.

2. The power tool as defined in claim 1, wherein, in addition to drive control of the motor, the indicating part includes an illuminating means that indicates at least one of a drive allowed state in which any one of the driving modes is selected and the drive prohibited state.

3. The power tool as defined in claim 1, which is provided and constructed as a hammer drill having at least one of hammer mode in which the tool bit is caused to perform only linear movement in its axial direction and drill mode in which the tool bit is caused to perform only rotation around its axis, and having hammer drill mode in which the tool bit is caused to perform both linear movement in its axial direction and rotation around its axis, as the driving modes of the tool bit.

4. The power tool as defined in claim 1, wherein the detecting part selects one of the driving modes when the dial is placed in a position indicating the one of the driving modes, and detecting the operating modes, and the detecting part selects the drive prohibited state when the dial is placed in a position indicating the drive prohibited state.

* * * * *